(12) United States Patent
Hollingsworth (10) Patent No.: US 8,087,321 B2
(45) Date of Patent: Jan. 3, 2012

(54) REMOVABLE SHOE GUARD (76) Inventor: Kyle Hollingsworth, Columbia, SC (US)

( * ) Notice: Subject to any disclaimer, the term of this patent is extended or adjusted under 35 U.S.C. 154(b) by 166 days.

(21) Appl. No.: 12/343,856

(22) Filed: Dec. 24, 2008

(65) Prior Publication Data

US 2009/0165907 A1    Jul. 2, 2009

Related U.S. Application Data (60) Provisional application No. 61/017,223, filed on Dec. 28, 2007.

(51) Int. Cl.
G05G 1/60 (2008.04)
(52) U.S. Cl. .......................................................... 74/564
(58) Field of Classification Search .................... 74/478, 74/478.5, 560, 562, 562.5, 564; 296/75; 150/154, 166, 167; 280/291
See application file for complete search history.

(56) References Cited

U.S. PATENT DOCUMENTS

| | | | | |
|---|---|---|---|---|
| 2,138,242 A * | 11/1938 | Nan | ................................. | 74/544 |
| 3,817,119 A * | 6/1974 | Scott et al. | ..................... | 74/563 |
| 4,458,910 A * | 7/1984 | Stillwagon | .................... | 280/291 |
| 5,482,307 A * | 1/1996 | Lin | ................................ | 280/291 |
| 5,638,723 A * | 6/1997 | Lin | ................................ | 74/564 |
| 6,161,859 A * | 12/2000 | Cheng | .......................... | 280/291 |
| 6,663,129 B1 * | 12/2003 | Smith | .......................... | 280/291 |
| 7,458,596 B1 * | 12/2008 | Serna | ............................ | 280/291 |
| D591,206 S * | 4/2009 | Donner | ....................... | D12/114 |

* cited by examiner

Primary Examiner — Vicky Johnson
(74) Attorney, Agent, or Firm — Samuel Alexander Long, Jr.; Calhoun Thomas, III (57) ABSTRACT The invention is a removable motorcycle gear shifter covering that prevents marring of a motorcyclist's shoe during upshifting operation. The device is elastic and designed to securely fit many different shift levers. It provides for weather resistant implementation, non-marring cushioned contact on upshifting, and non-slip tread on downshifting.

10 Claims, 9 Drawing Sheets

REMOVABLE SHOE GUARD

RELATED APPLICATIONS

This application claims the benefit of prior filed, pending, U.S. Provisional Application 61/017,223.

FEDERALLY SPONSORED RESEARCH OR DEVELOPMENT

Not applicable.

REFERENCED OR INCORPORATED MATERIAL

Not applicable.

FIELD OF THE INVENTION

The present invention relates to the field of motorcycle gear shifting and more specifically to a removable guard for a gearshift lever.

BACKGROUND OF THE INVENTION

The present invention is a removable shoe guard designed to cover the shifting mechanism of motorcycles and similar transportation vehicles. In this application, references to "lever" or "shifting lever" refer to that portion of the shifting mechanism that is typically parallel to the ground and designed to come into contact with the operator's shoe as opposed to that portion of the shifting mechanism designed to function as a lever arm providing displacement from the gear box.

Gears in many motorcycles are changed via a foot operated shifting lever. Such levers require the operator to maneuver the lever up or down by respectively lifting up on the lever or stepping down on the lever. During the lifting motion, the operator positions his foot beneath the lever and lifts up so that the top of his shoe comes into contact with the bottom of the lever.

On a typical motorcycle, the lever is comprised of metal with a hard rubber covering. The rubber is primarily disposed on the end portion of the lever that comes into contact with the shoe of the operator.

During routine operation, the operator of such a vehicle will shift up and down quite frequently. Each time, the operator must manipulate the shifting lever with his foot. These actions bring both the top of the operator's shoe and the bottom of the operators shoe into frequent contact with the shifting leaver at the end where the hard rubber covers the metal. After such frequent use, the operator may experience scuff marks or wearing away of the shoe material. Also, it is common for the shoe to slip from the shifter while attempting to down shift.

SUMMARY OF THE INVENTION

The present invention is a removable shoe guard device designed to cover the shifting mechanism of motorcycles and similar personal transportation vehicles. Tubular in shape, the invention is designed to fit over the existing gear shifter and provide appropriate surfaces for upshifting and downshifting of the gears of the vehicle.

The shoe guard is made from a tight elastic mesh fabric that conforms to the general shape of the shifting mechanism. In the preferred embodiment, this material is a natural, non marring material, such as cotton laced with materials having elastomeric properties. In place of cotton, though, other natural and synthetic fibers could work.

The device is designed to be water repellant so that water may not hinder the requisite shifting maneuvers during operation.

Importantly, the tight elasticity of the device is a critical element as it allows the device to fit many different shifters without coming dislodged during use. These elastic properties radiate outward in an X-Y cross section of the device such that there is compression around the shifter lever. In other words, the inner and outer diameters of the device will expand and contract as necessary in order to fit a particular shifting lever.

With respect to the top surface of the device upon which the shoe of the operator depresses to down shift, there are three alternate embodiments. One embodiment utilizes raised treads as a means for providing a non-slip surface. A second embodiment utilizes the native tread of the shifting mechanism as a means for providing a non-slip surface. As noted above, this native tread is often a hard rubber. The third embodiment utilizes neither raised tread nor native tread but instead relies on the surface level friction forces when the operator is downshifting.

With respect to the raised tread embodiment, the device will completely cover the shifter and none of the native tread, to the extent any exists, will be exposed. In this way, the top surface of the device has a non slip tread fixedly attached thereon. In the preferred embodiment, this tread is made of a non-marring rubber though other materials may also be utilized. When an operator is downshifting, his foot will come into contact with this raised rubber tread.

With respect to the native tread embodiment, there is a large opening or hole in the mesh that allows the native tread of the shifting mechanism to come into contact with the shoe of the operator.

The bottom surface of the device is a soft cushioning, durable, and non-marring mesh. This mesh cushions the top portion of the operator's shoe without marring or crowding the shoe shifting area, the area between the shoe and the shifting lever, of the motorcycle.

With respect to the third embodiment that uses neither raised nor native tread, the surface wherein the bottom of the operator's shoe contacts the device will be uniform across the total outer surface of the device. The advantage to this embodiment is that it may be positioned at any relative position around the shift lever.

DETAILED DESCRIPTION

It is to be understood by a person having ordinary skill in the art that the present discussion is a description of exemplary embodiments only, and is not intended as limiting the broader aspects of the present invention. The following example is provided to further illustrate the invention and is not to be construed to unduly limit the scope of the invention.

The present invention is a removable shoe guard device designed to cover the shifting mechanism (10) of motorcycles (12) and similar personal transportation vehicles so as to protect the shoe (11) from marring, scuffing, and deterioration. The body of the device is made of a woven mesh fabric that has elastic properties allowing it to conform to the general shape of the shifting mechanism (10). This elasticity also applies pressure to the surface of the shifting mechanism (10) which, along with the force of friction, keeps the device firmly in place on the shifting mechanism (10). The device has a generally hollow cylindrical or tubular shape and comprises an inner surface (22) and an outer surface (23).

The inner surface (22) of the device is relatively uniform and is designed to firmly contact the shift lever (10) so that the device does not dislodge from the lever (10). The inner surface (22), thus, generally, will have a higher coefficient of friction than the outer surface (23). The inner surface (22) takes the shape of a tube with one open end (see FIG. 5). It is through this open end that that the device is inserted onto the shifter lever (10).

Conversely, the outer surface (23) is characterized by a soft, non marring material. This material is also water resistant, and generally has a lower coefficient of friction than that of the inner surface (22). The outer surface (23) is inclusive of the bottom portion (30) of the device where the top of the operator's shoe (13) comes into contact with the device when the operator is up-shifting (see FIGS. 1, 2, 4, 5, 7, and 8). The material of the outer surface (23) is designed to soften the impact of the shoe (13) pressing upward on the lever (10). In one embodiment, these properties of the outer surface (23), as different from the inner surface (22), are achieved by applying a readily available coating to the outer surface (23) material which enhances its non-marring, water resistant properties.

The nonslip downshift function (32) of the present invention occurs via three alternate means. One such mean includes raised treads (40) projecting above the outer surface (23) (see FIGS. 1, 1A, 2, and 3). These treads (40) are only on the top portion (31) of the outer surface (23) where the bottom of the shoe (14) contacts the top portion (31) of the device. The treads (40) are made of a nonslip water resistant material such as rubber. In the preferred embodiment, the treads (40), are fixedly attached to the top portion (31) of the device and comprise parallel strips of rubber running parallel to the length of the shifter lever (10).

Figures 1, 1A:
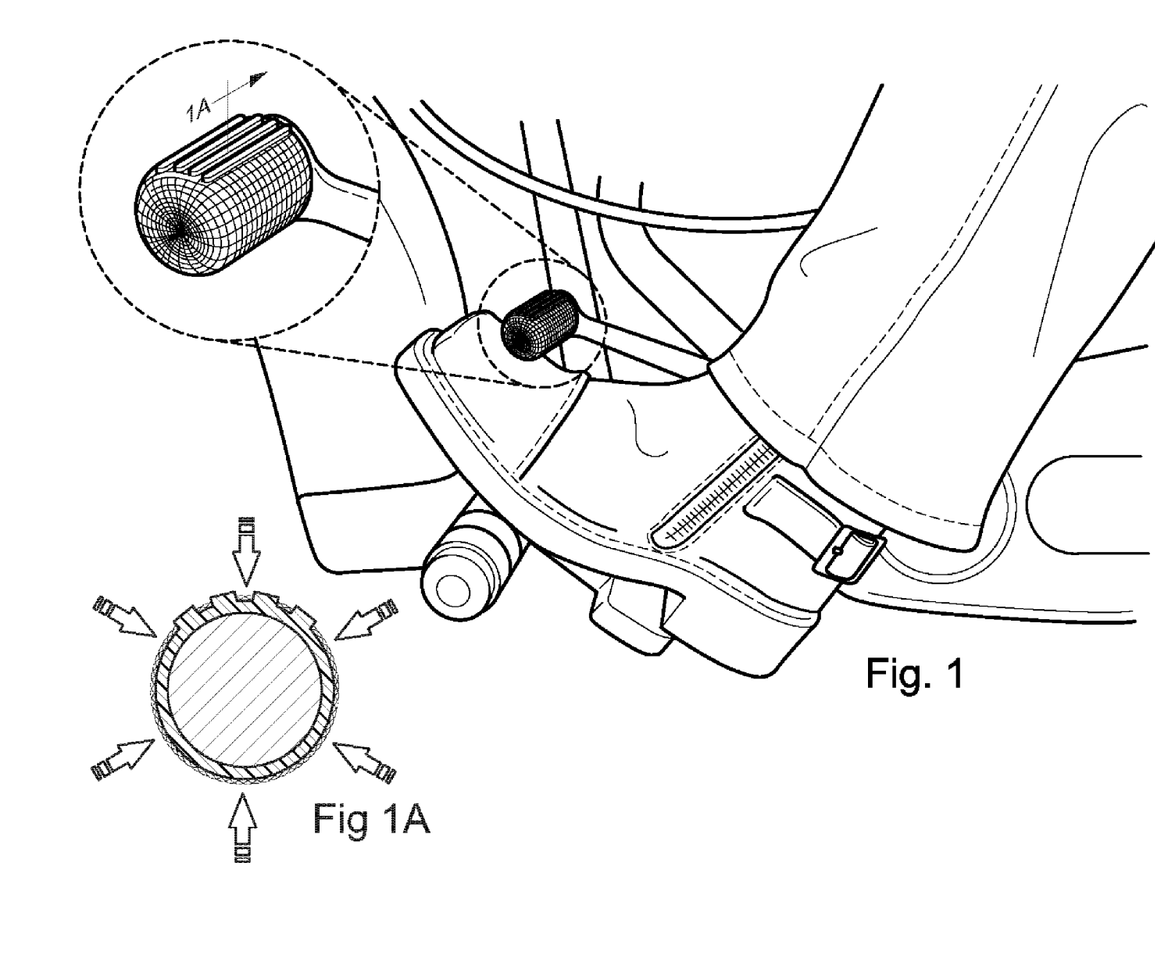
FIG. 1 is perspective view showing the device installed on a shift lever being used to upshift and highlighting the raised tread means.
FIG. 1A is a cross section view of the device showing the metal core of the shifter, the inner surface, the outer surface, and the raised treads.
Figure 2:
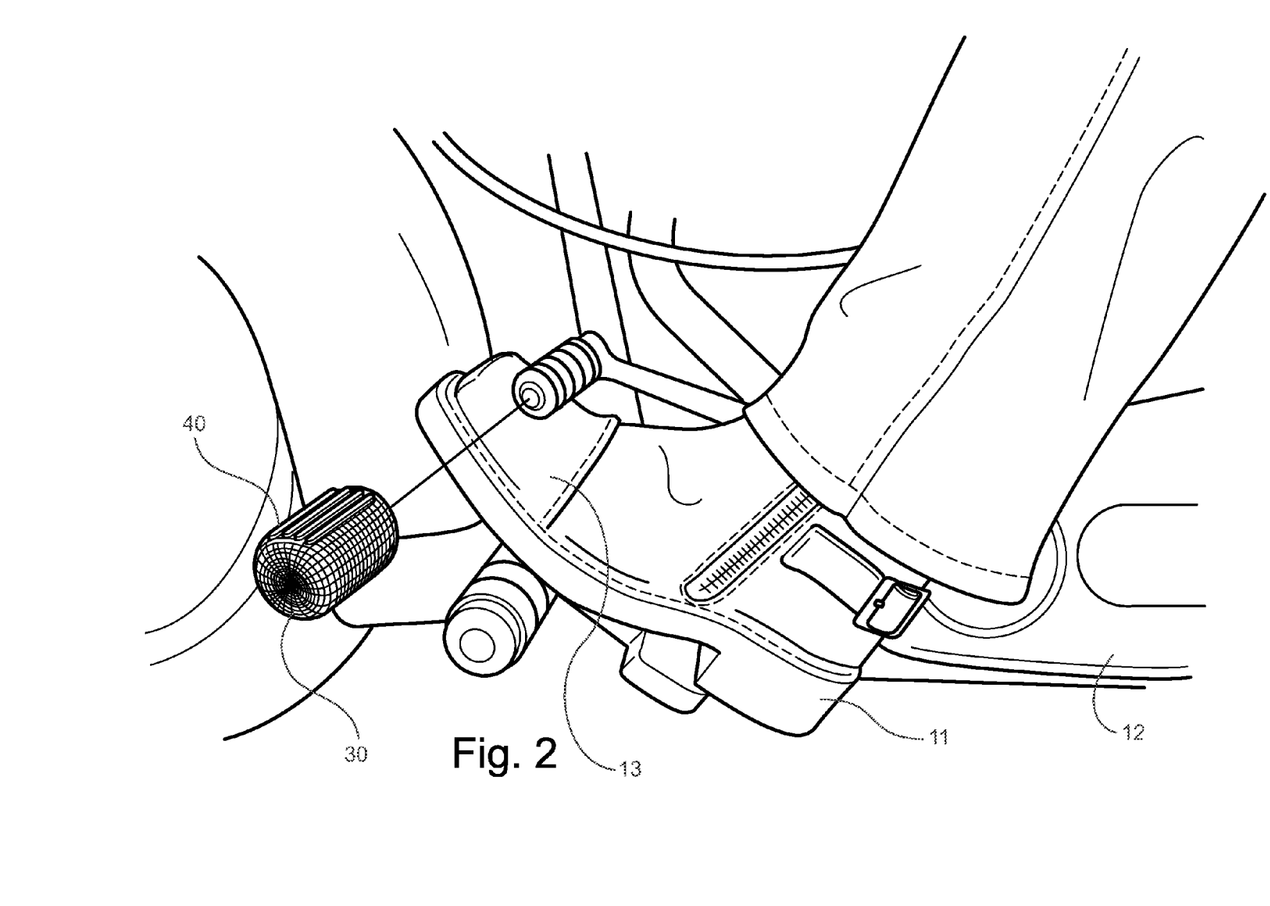
FIG. 2 is a perspective view showing how the device with raised tread means is to be installed on a shift lever.
Figure 3:
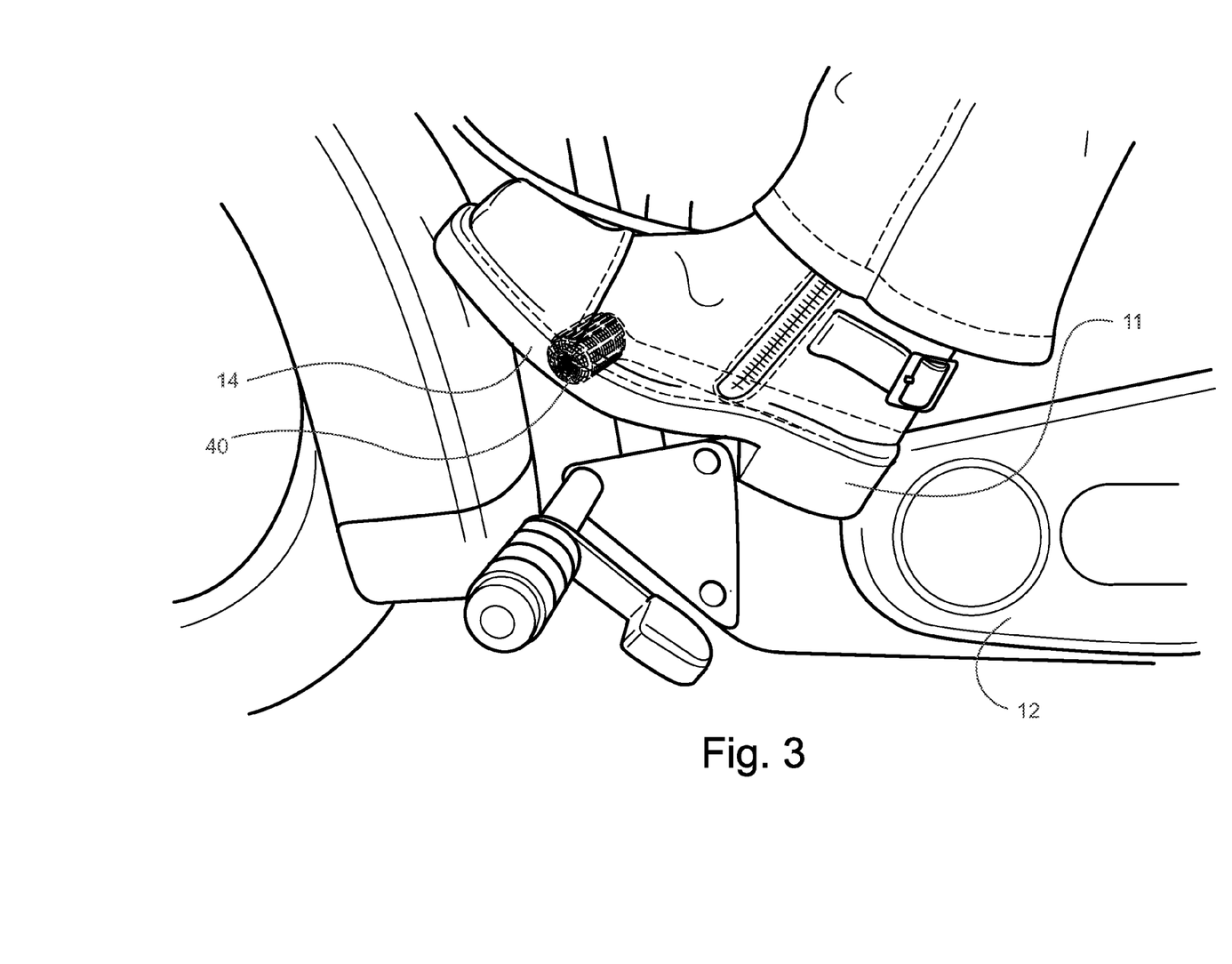
FIG. 3 is a perspective view showing the device installed on a shift lever being used to downshift with the bottom of the shoe contacting the raised tread means.
Figure 4:
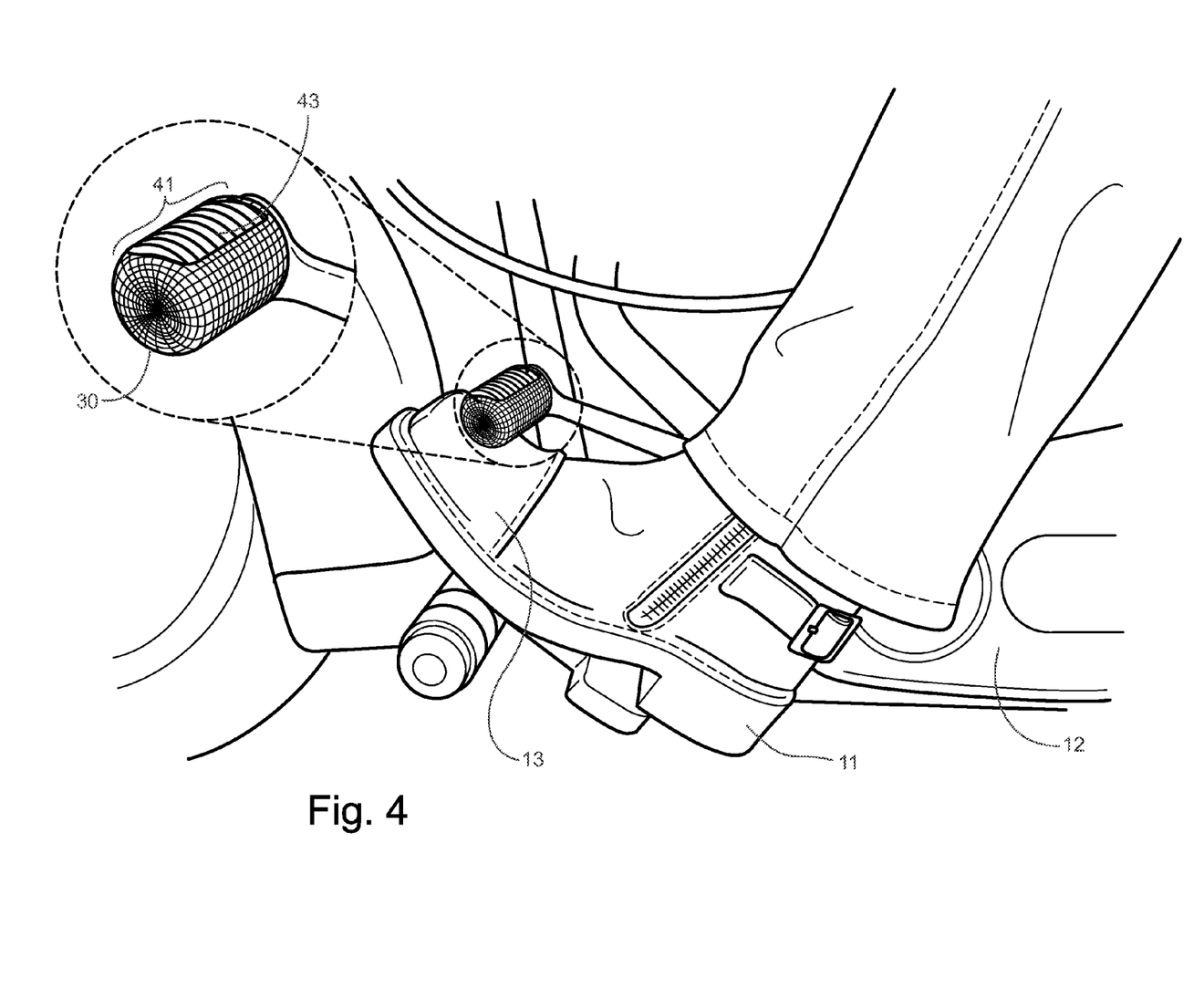
FIG. 4 is a perspective view showing the device installed on a shift lever being used to upshift and highlighting the native tread means.
Figure 5:
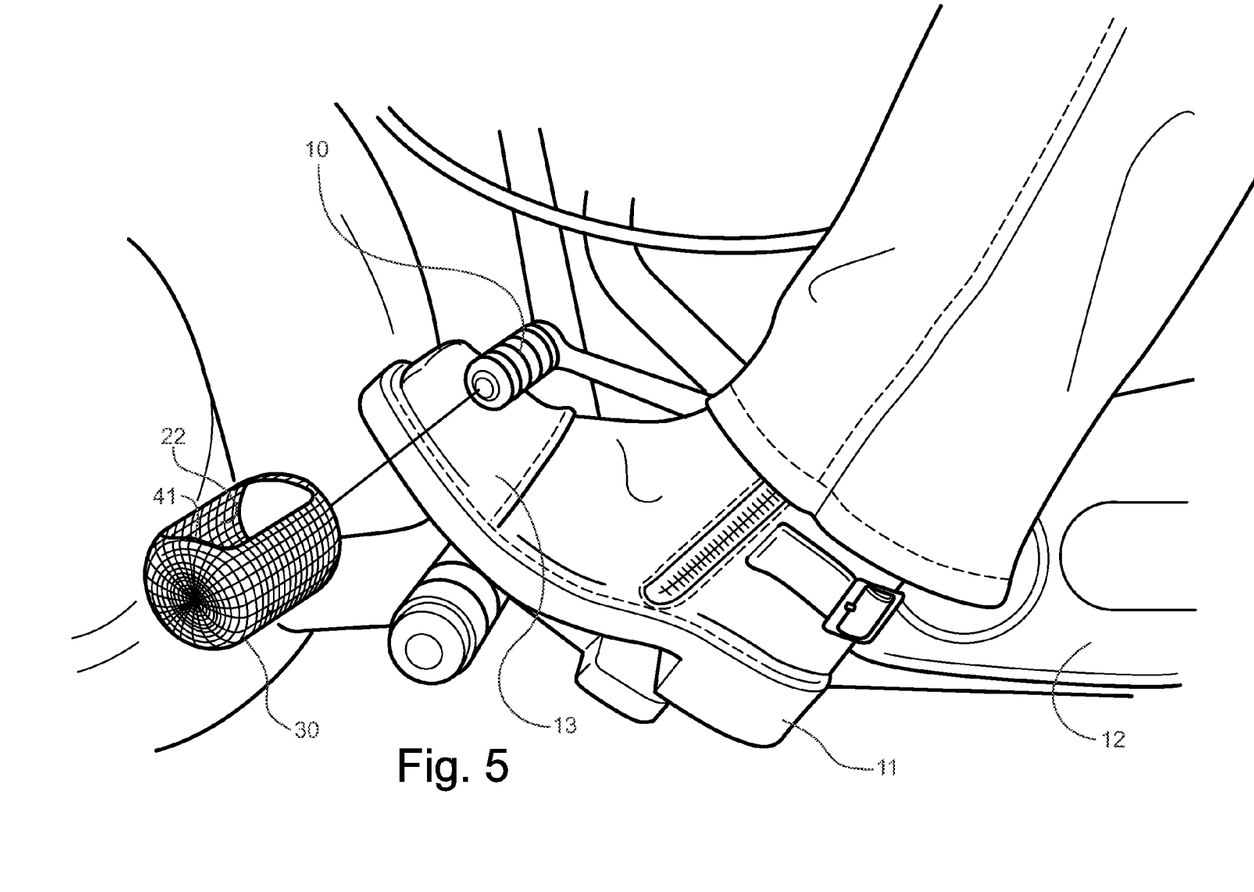
FIG. 5 is a perspective view showing how the device with native tread means is to be installed on a shift lever.
Figure 6:
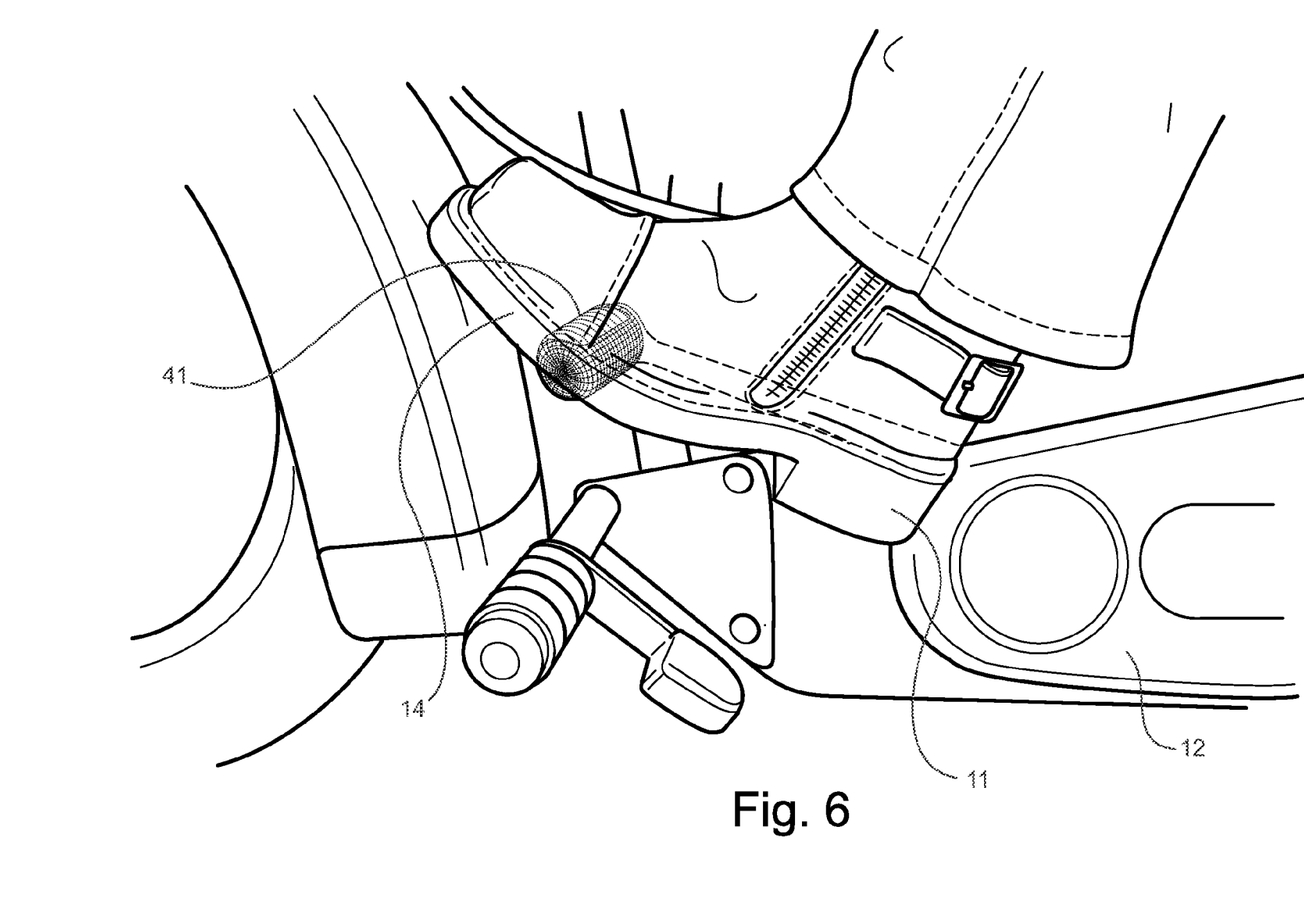
FIG. 6 is a perspective view showing the device installed on a shift lever being used to downshift with the bottom of the shoe contacting the native tread means.
Figures 7, 7A:
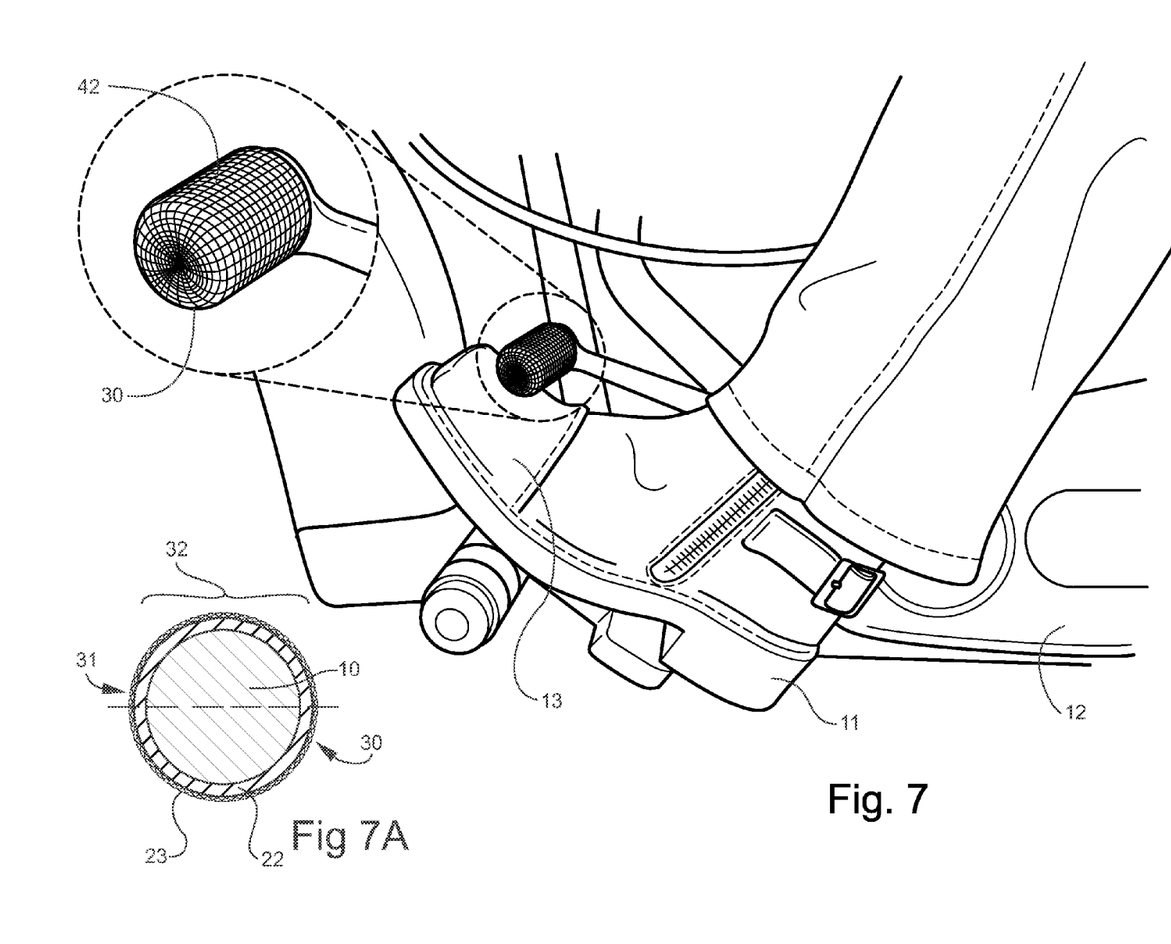
FIG. 7 is a perspective view showing the device installed on a shift lever being used to upshift.
FIG. 7A is a cross section view of the device showing the metal core of the shifter, the inner surface, the outer surface, and the down-shift function area.
Figure 8:
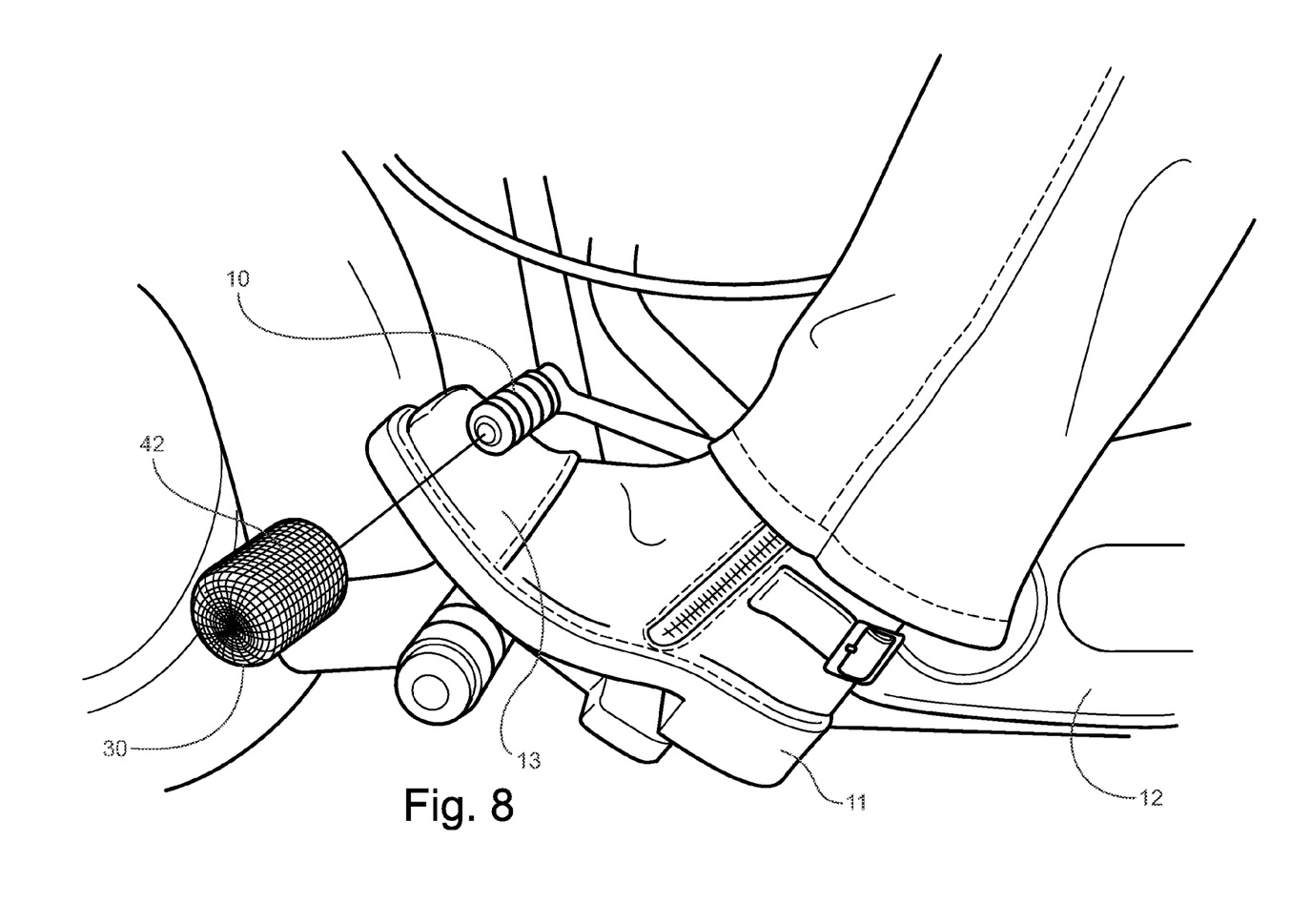
FIG. 8 is a perspective view showing how the device is to be installed on a shift lever.
Figure 9:
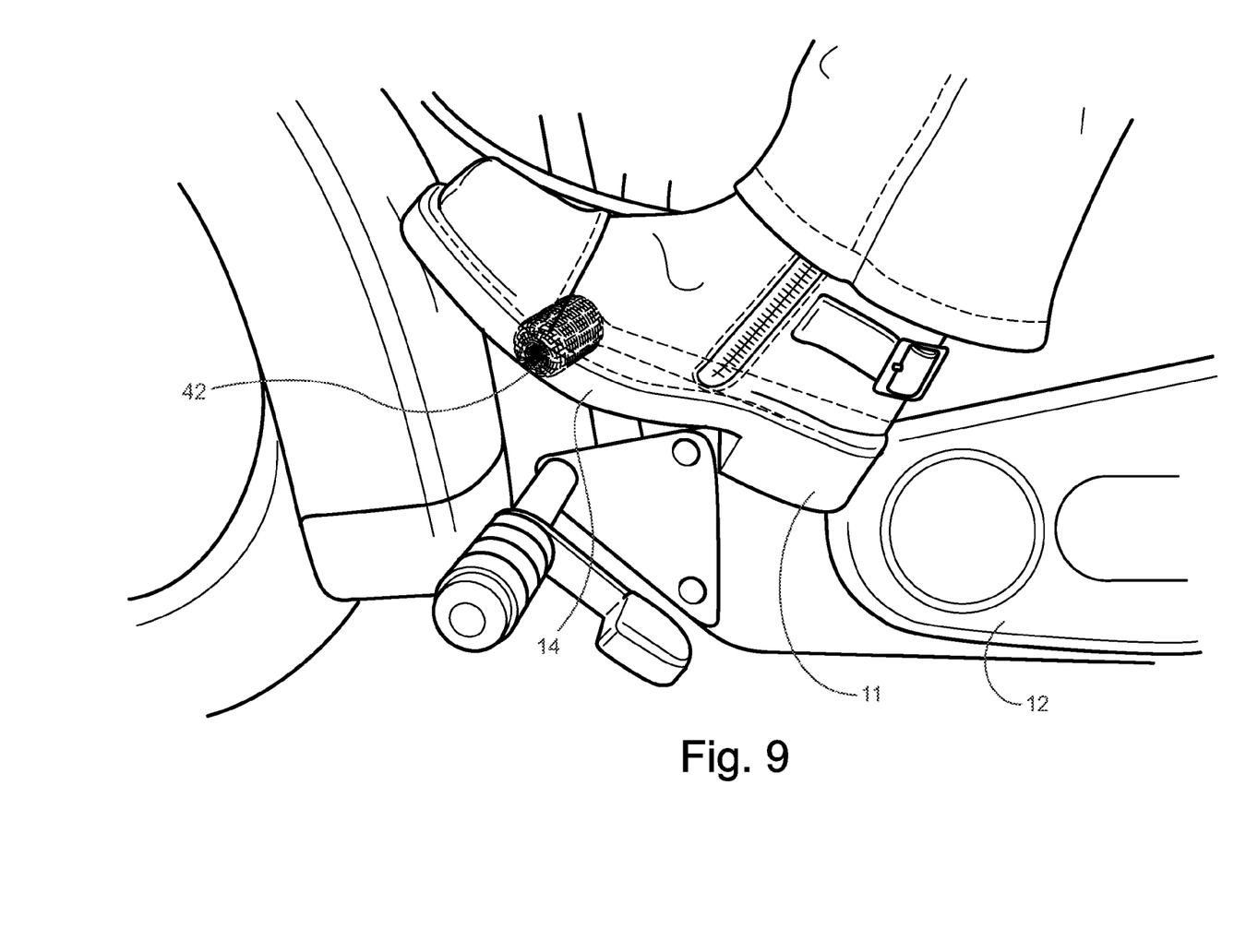
FIG. 9 is a perspective view showing the device installed on a shift lever being used to downshift.

A second means of the nonslip downshift function (32) is via a holed opening (41) located on the top portion (31) of the device (see FIGS. 4, 5, and 6). This holed opening (41) allows the bottom portion of the operator's shoe (14) to come into contact with the native tread (43) of the shifting mechanism (10) when the operator is downshifting. This holed opening (41) is sized relative to the curvature of the shifting mechanism (10) and the thickness of the device so that when the shoe (11) is depressed downward on the shifter (10), the shoe (11) primarily contacts the native treads (43) of the shifter (10) and not the material of the device.

A third means of the nonslip downshift function (32) is via the outer surface (23) of the device itself and uses neither the raised rubber tread (40) nor the native tread (43) (see FIGS. 7, 7A, 8, and 9). Instead, the level surface of the device (42) is used to provide the nonslip downshift function (32). Thus, the shoe will directly contact the outer surface (23) of the device.

I claim:

1. A removable shoe guard comprising: a woven mesh hollow cylindrical tube for covering a foot operated gear shifting mechanism of a personal transportation vehicle, said removable shoe guard comprising an open end and a closed end; an inner surface and an outer surface, said outer surface further comprising a bottom portion and a top portion having a downshift function area disposed thereon, said outer surface further comprising a non marring fabric material and a-polytetrafluoroethylene coating affixed to said non marring fabric material, said bottom portion defined by that area that comes into contact with a top of a shoe of a human operator who is up shifting the foot operated gear shifting mechanism of the personal transportation vehicle, said inner surface comprising a uniform texture and a coefficient of friction, with respect to the foot operated gear shifting mechanism of a personal transportation vehicle, that is larger than that of said bottom portion of said outer surface, with respect to the shoe of the human operator; and said inner surface further comprising an elastomeric lacing.

2. The removable shoe guard of claim 1 wherein said downshift function area further comprises a raised tread fixedly attached to the downshift function area.

3. The removable shoe guard of claim 2 wherein said raised tread comprises a plurality of parallel rubber strips extending lengthwise less than the overall length of the removable shoe guard.

4. The removable shoe guard of claim 1 wherein said downshift function area is a holed opening.

5. The removable shoe guard of claim 4 wherein said holed opening is constructed to a size that allows a sole of the shoe of the human operator to come into contact with a set of native treads attached to the foot operated gear shifting mechanism of a personal transportation vehicle.

6. A removable shoe guard comprising: a woven mesh hollow cylindrical tube for covering a foot operated gear shifting mechanism of a personal transportation vehicle wherein the removable shoe guard further comprises an elastic compression around a longitudinal z axis, an open end, a closed end, an inner surface, and an outer surface, said inner surface comprising an elastomeric lacing, uniform texture, and a coefficient of friction that is larger than that of said outer surface, said outer surface being made from a non-marring material coated with polytetrafluoroethylene and comprising a bottom portion and a top portion, said bottom portion being that portion that comes into contact with the shoe when an operator is up-shifting, said top portion further comprising a down-shift function area.

7. The removable shoe guard of claim 6 wherein said down-shift function area further comprises a raised tread fixedly attached to the downshift function area.

8. The removable shoe guard of claim 7 wherein said raised tread comprises a plurality of parallel rubber strips extending lengthwise less than the overall length of the removable shoe guard.

9. The removable shoe guard of claim 6 wherein the downshift function area is a holed opening.

10. The removable shoe guard of claim 9 wherein said holed opening is constructed to a size that allows a sole of the shoe of the human operator to come into contact with a set of native treads attached to the foot operated gear shifting mechanism of a personal transportation vehicle.

* * * * *